(12) United States Patent
Günthner et al.

(10) Patent No.: US 9,582,446 B2
(45) Date of Patent: Feb. 28, 2017

(54) DEVICE FOR DISTRIBUTING DATA ABOUT A VEHICLE

(75) Inventors: Stefan Günthner, Frankfurt (DE); Klaus Rink, Rodenbach (DE); Ulrich Stählin, Eschborn (DE); Jürgen Kunz, Frankfurt am Main (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 322 days.

(21) Appl. No.: 14/241,910

(22) PCT Filed: Sep. 12, 2012

(86) PCT No.: PCT/EP2012/067844
§ 371 (c)(1),
(2), (4) Date: Feb. 28, 2014

(87) PCT Pub. No.: WO2013/037827
PCT Pub. Date: Mar. 21, 2013

(65) Prior Publication Data
US 2014/0215115 A1 Jul. 31, 2014

(30) Foreign Application Priority Data

Sep. 12, 2011 (DE) .................. 10 2011 082 525

(51) Int. Cl.
*H04L 12/40* (2006.01)
*G06F 13/40* (2006.01)
*H04L 29/08* (2006.01)

(52) U.S. Cl.
CPC .............. *G06F 13/40* (2013.01); *H04L 12/40* (2013.01); *H04L 67/12* (2013.01); *H04L 2012/40273* (2013.01)

(58) Field of Classification Search
CPC .......... G06F 13/40; G06F 13/38; G06F 13/36; G06F 13/4063; H04L 12/40; H04L 67/12; H04L 2012/40273; H04L 2012/40267
See application file for complete search history.

(56) References Cited

U.S. PATENT DOCUMENTS

| 4,584,487 A | * | 4/1986 | Hesse ................ B60R 16/0315 |
| | | | 307/38 |
| 5,087,919 A | * | 2/1992 | Odagawa ................ G01S 19/50 |
| | | | 342/357.3 |

(Continued)

FOREIGN PATENT DOCUMENTS

| DE | 10 2007 047 337 A1 | 5/2008 |
| DE | 10 2008 061 304 A1 | 7/2009 |

(Continued)

OTHER PUBLICATIONS

PCT International Search Report—Aug. 1, 2013.
(Continued)

*Primary Examiner* — Farley Abad
(74) *Attorney, Agent, or Firm* — Brinks Gilson & Lione (57) ABSTRACT

A device for distributing data about a vehicle, has a first sensor data reception interface for receiving first sensor data from a first sensor, a second sensor data reception interface for receiving second sensor data from a second sensor, and a transmission interface for transmitting the data about the vehicle on the basis of the first sensor data and the second sensor data to a receiver. A vehicle and an on-board system which incorporate the devise are also encompassed herein.

7 Claims, 9 Drawing Sheets

(56) References Cited

U.S. PATENT DOCUMENTS

| | | | | |
|---|---|---|---|---|
| 5,432,497 | A * | 7/1995 | Briski | G01P 1/07 340/461 |
| 6,338,012 | B2 * | 1/2002 | Brown | 303/189 |
| 2002/0087882 | A1 * | 7/2002 | Schneier | G06F 21/552 726/23 |
| 2003/0114980 | A1 * | 6/2003 | Klausner | G01C 21/26 701/32.7 |
| 2006/0180372 | A1 * | 8/2006 | Mercier | B60T 8/1706 180/210 |
| 2009/0276127 | A1 * | 11/2009 | Dix | G01C 21/005 701/50 |
| 2011/0118979 | A1 | 5/2011 | Marti | |

FOREIGN PATENT DOCUMENTS

| | | |
|---|---|---|
| DE | 10 2009 028 813 A1 | 2/2011 |
| WO | WO 2008/068542 A1 | 6/2008 |
| WO | WO 2008/095117 A2 | 8/2008 |
| WO | WO 2009 027244 A1 | 3/2009 |

OTHER PUBLICATIONS

German Examination Report—May 7, 2013.
Implementation of In-Vehicle Multi-Sensor Information Fusion Gateway for Cooperative Driving—Ting-Ying Wei et al.—2011 Second International Conference on Intelligent Systems, Modelling and Simulation.

* cited by examiner

DEVICE FOR DISTRIBUTING DATA ABOUT A VEHICLE

CROSS REFERENCE TO RELATED APPLICATIONS

This application claims priority to German Patent Application No. 10 2011 082 525.8, filed Sep. 12, 2011 and PCT/EP2012/067844, filed Sep. 12, 2012.

FIELD OF THE INVENTION

The invention relates to a device for distributing data about a motor vehicle, to an on-board system including the device, and to a vehicle having the on-board system.

BACKGROUND OF THE INVENTION

In current motor vehicle architectures, sensors and/or sensor elements are primarily allocated to certain functions and/or certain functional facilities.

It is the object of this invention to improve the vehicle architecture.

The object is achieved by the features of the system described herein. Preferred developments are also described.

SUMMARY OF THE INVENTION

According to one aspect of the invention, a device for distributing at least data about a vehicle includes a first sensor data reception interface for receiving first sensor data, a first sensor, a second sensor data reception interface for receiving second sensor data from a second sensor and a transmission interface for transmitting the data about the vehicle on the basis of the first sensor data and the second sensor data to a receiver.

In a development of the specified device, the first sensor data reception interface is provided for receiving position data from a position data sensor as the first sensor.

In another development of the specified device, the second sensor data reception interface is provided as a databus interface for receiving the second sensor data from the second sensor which is connected to a databus.

In yet another development of the specified device, the second sensor data are steering angle data from a steering angle sensor as the second sensor.

In a particular development of the specified device, the transmission interface includes a fusion facility for linking the first sensor data and the second sensor data.

In an alternative development of the specified device, the transmission interface includes a filter for filtering the data about the vehicle from the linked position data and sensor data.

According to another aspect of the invention, an on-board system for a vehicle includes a databus, a sensor, connected to the databus, which is configured for feeding sensor data into the databus and a specified device, connected to the databus, for distributing at least data about a vehicle on the basis of the sensor data.

In a development, the specified on-board system includes an antenna for wirelessly transmitting the data about the vehicle.

According to a further aspect of the invention, a vehicle includes a specified on-board system.

BRIEF DESCRIPTION OF THE DRAWINGS

The characteristics, features and advantages of this invention, described above, and the manner in which these are achieved will become clearer and more distinctly understandable in conjunction with the following description of the exemplary embodiments which will be explained in greater detail in conjunction with the drawings, in which.

In the figures, identical technical elements are provided with identical reference symbols and described only once.

DETAILED DESCRIPTION OF THE INVENTION

Figure 1:
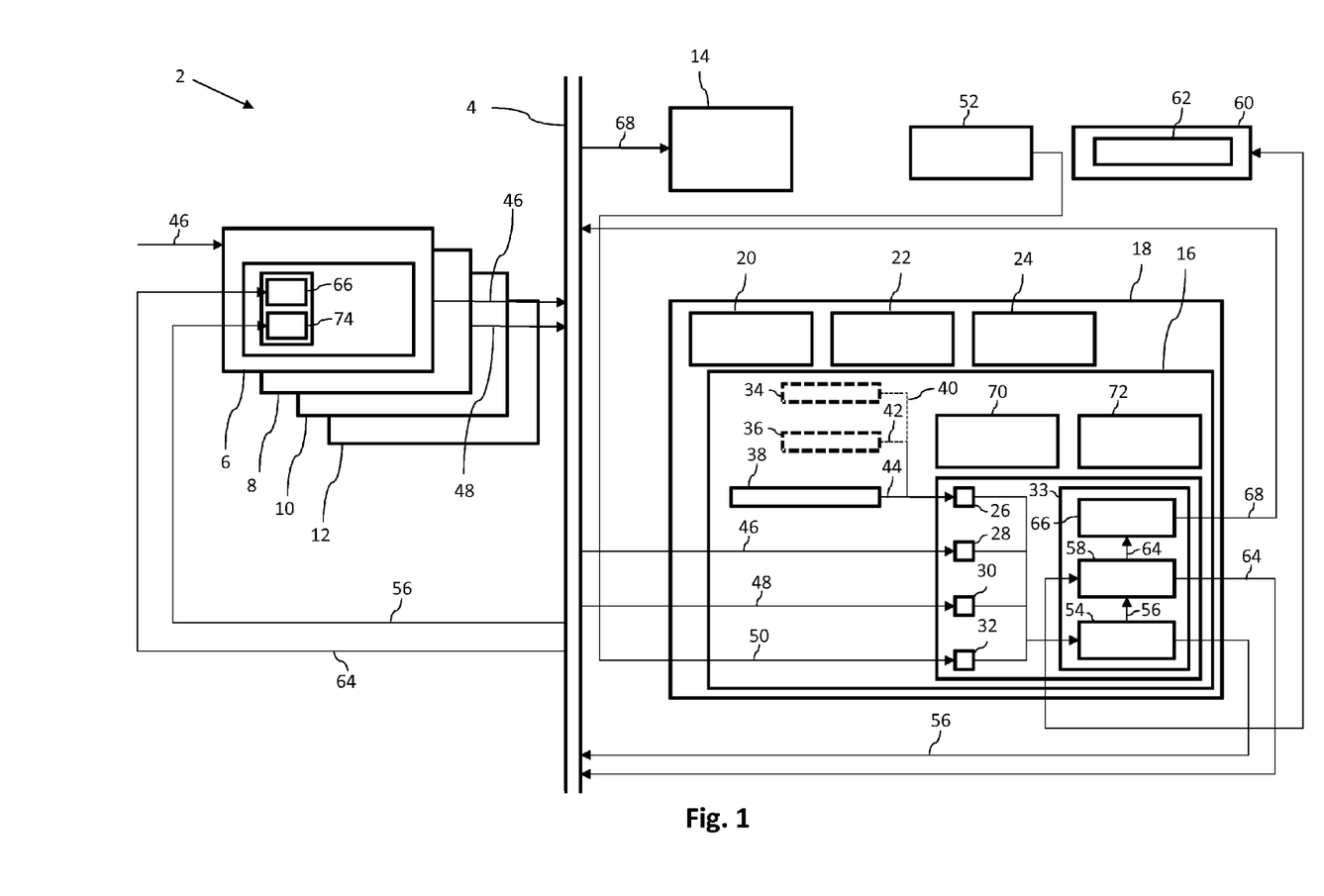
FIG. 1 shows a diagrammatic view of a section from a vehicle on-board system.

Reference is made to FIG. 1 which shows a diagrammatic view of a section from an on-board system 2 for a vehicle not shown in further detail.

The on-board system 2 includes a databus 4 which can be, for example, a Controller Area Network bus, called CAN bus, or a FlexRay bus, known to the expert. These data buses are standardized and their operation can be looked up in the relevant specifications.

To the databus 4, various modules are connected, all or which communicate with one another via the databus 4. These modules include controller 6 for an electronic stability control of the vehicle not shown in greater detail, called ESC controller 6 in the text which follows, a controller 8 for an electronic steering angle support of the vehicle not shown in further detail, called EPS controller 8 in the text which follows, a controller 10 for an airbag of the vehicle not shown in further detail, and further controllers 12 in the vehicle not shown in further detail, for which the reference symbol 12 will be used jointly in the text which follows. These further controllers 12 may further include a controller for an electronic braking assistant, a controller for an electronic steering assistant and a controller for an automatic speed control.

Furthermore, the display device 14, which, in the text which follows, will be called HMI device 14 for "Human Machine Interface" device, is connected to the databus 4. It can also feed data into the databus 4 in a manner not shown if, for example, the HMI device 14 is constructed as a touchscreen.

Finally, a device 16 for distributing data about the vehicle, not shown, is also connected to the databus 4 which, in the text which follows, will be called M2XPro device 16 for "motion information to different providers" device 16.

The M2XPro device 16 is embedded in an M2XPro cluster 18 which provides an electrical power supply 20, hardware interfaces and protective means 22 and a housing 24 for the M2XPro device 16.

The M2XPro device 16 has a vehicle dynamics interface 26, a wheel speed interface 28, a steering angle interface 30, a Global Position System interface 32, called GPS interface 32 in the text which follows, and an output interface 33.

At the vehicle dynamics interface 26, vehicle dynamics data are received which are provided by an optional pitch rate sensor 34, an optional roll rate sensor 36 and a yaw rate sensor 38 in a known manner. In detail, the vehicle dynamics data therefore includes an optional pitch rate 40, an optional roll rate 42 and a yaw rate 44. In a manner not shown, a longitudinal, transverse and vertical acceleration can also be received correspondingly by a longitudinal, transverse and vertical acceleration sensor via the vehicle dynamics interface 26.

At the wheel speed interface 28, the wheel revolutions 46 of the individual wheels of the vehicle, not shown in further detail, can be received in a manner still to be described.

At the steering angle interface 30, a steering angle 48 of a steering wheel of the vehicle, not shown in further detail, can be received in a manner still to be described.

Finally, position data 50 can be received at the GPS interface 32 from a GPS receiver 52 which can be arranged outside the M2XPro cluster 18.

The received data 40 to 50 received via the various reception interfaces 26 to 32, are delivered to the output interface 33 which, in the present embodiment, also performs the transformation of the received data 40 to 50 into transmission data, yet to be written, beyond the pure delivery of the data 40 to 50 to other modules. For this purpose, the output interface 33 has a fusion facility 54 in the present embodiment, which receives the received data 40 to 50 and, on the basis of these, generates the above-mentioned data about the vehicle, not shown.

These data can be any information about the vehicle. Thus, for example, this information can include verified data which have been checked for their reliability on the basis of redundant information. This can be, for example, a verified yaw rate 44 which has been stabilized by means of the steering angle 48 since the steering angle 48 and the yaw rate 44 are related to one another. As an alternative or additionally, this information can include, for example, also position data which cannot be supplied by the GPS receiver 52. If the vehicle, not shown in greater detail, drives at locations at which no GPS signals can be received, such as in a tunnel, position data which cannot be supplied by the GPS receiver 52 can be derived, for example, by the fusion facility 54 on the basis of the last position data 50 received from a GPS receiver 52, the steering angle 48 and a speed, derived from the wheel revolutions 46, of the vehicle, not shown. The fusion facility 54 is thus configured for generating new sensor data from sensor data present in the vehicle, not shown in further detail, or verifying sensor data already existing, for example by means of validation.

The data 56 generated by the fusion facility 54 can be fed back into the databus 4, on the one hand, or transferred to a first filter 58. The generated data 56 fed into the databus 4 are then available to the other modules for further processing.

The generated data transferred to the first filter 58 can be filtered in the first filter 58 in a manner not specified in greater detail and transferred to a distributor antenna 60 with a second filter 62. The distributor antenna 60 is used for communication of the vehicle, not shown, with other vehicles and will therefore be called Car2X antenna 60 in the text which follows. The communication may take place wirelessly, a so-called automotive WLAN possibly being employed, be based on IEEE 802.11p, and can have further protocol layers correspondingly based thereon such as IST-G5 in Europe or IEEE 1609 in the USA. The first filter 62 can therefore transfer filtered generated data 56 to the Car2X antenna 60 or receive data from the Car2X antenna 60.

The filtered generated data 56 or the received data can be used as input data for the most varied applications 66. These applications 66 can include, for example, the derivation of position data previously mentioned if the GPS signal 50 can no longer be received. As an alternative or additionally, these applications 66 can include information applications which inform, for example, about jams or other traffic situations or traffic-related traffic situations. In the text which follows, the applications 66 are combined under the term Car2X applications 66 which, in turn, can feed their output data 68, that is to say the forwarded position data or the traffic information, into the databus 4.

The interfaces 26 to 33 mentioned above can be combined in a hardware interface 70 in the M2XPro device 16. To implement the other functions in the M2XPro device 16, further hardware elements 72 can be provided.

The output data 68 such as the ongoing position data or the traffic information can be displayed, for example, on the HMI device 14 for navigation.

The input data 64 or the generated data 56 can be distributed to other modules in the vehicle not shown which, in turn, can have Car2X applications 66. In the present embodiment, this is shown by means of the ESC controller 6. Furthermore, system algorithms 74 which use the generated data 56 directly can also be present in the individual controllers 6 to 12.

In the present embodiment, the wheel revolutions 46 and the steering angle 48 are acquired accordingly with the ESC controller 6 and the EPS controller 8 which must acquire these data in any case for their intended operation.

Figure 2:
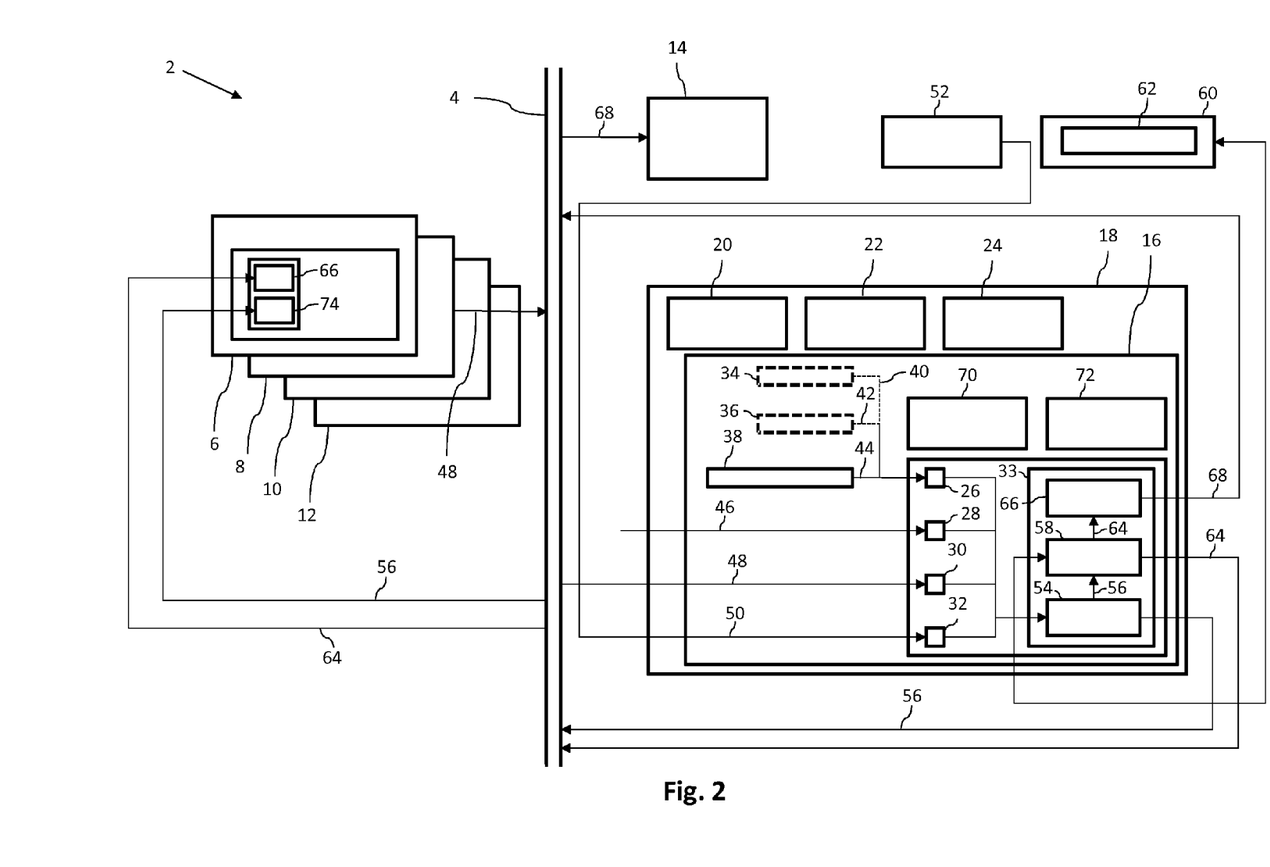
FIG. 2 shows a diagrammatic view of a section from an alternative vehicle on-board system.

Reference is made to FIG. 2 which shows a diagrammatic view of a section from an alternative vehicle on-board system 2.

In FIG. 2, the wheel revolutions 46 are fed directly into the M2XPro device 16 from the individual wheel speed sensors, not shown in greater detail. They can then be fed into the system algorithms 74 of the ESC controller 6, for example as generated data 56, so that they are available for the basic functionality of the ESC controller 6.

Figure 3:
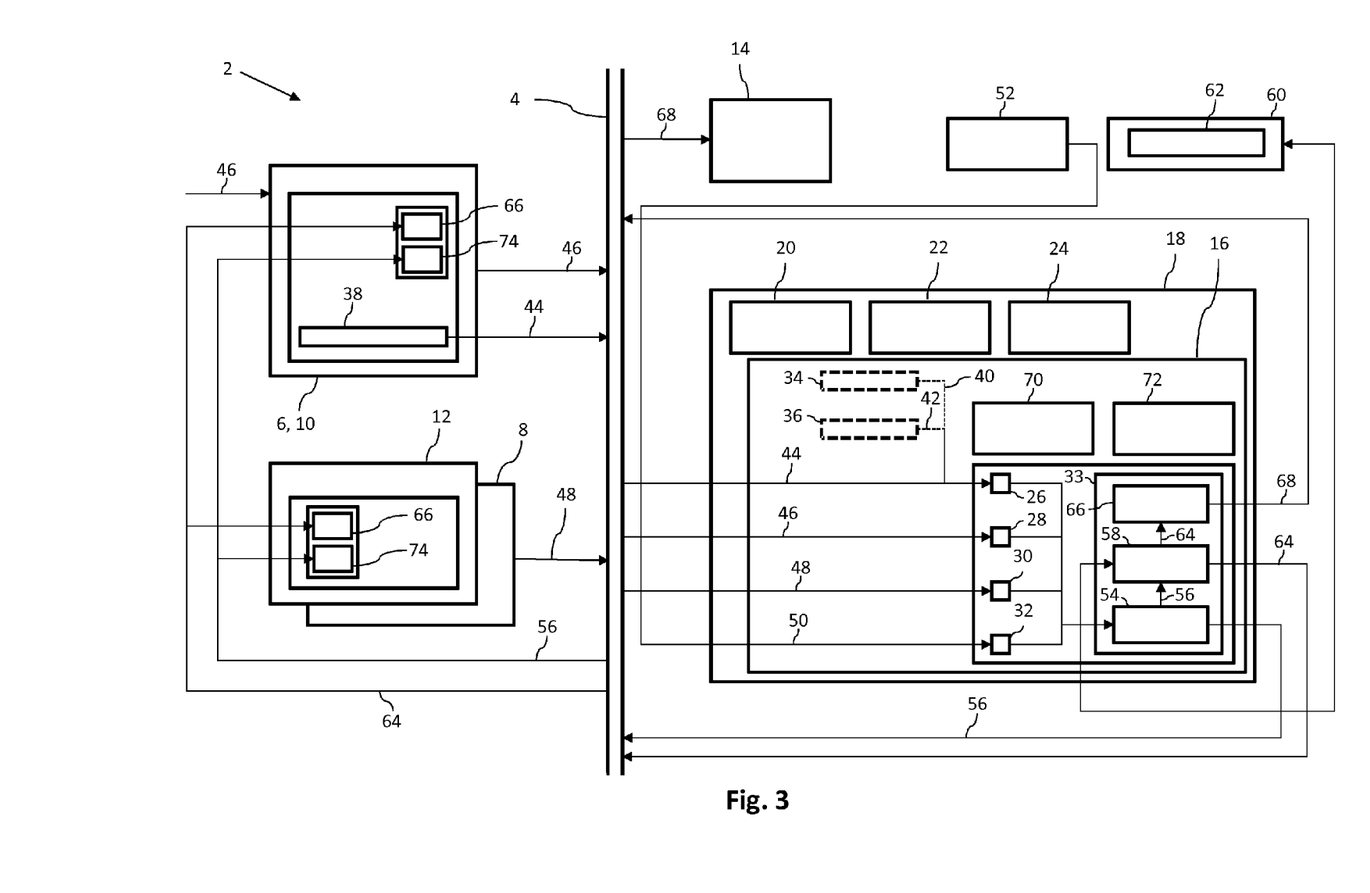
FIG. 3 shows a diagrammatic view of a section from an alternative vehicle on-board system.

Reference is made to FIG. 3 which shows a diagrammatic view of a section from an alternative vehicle on-board system 2.

In FIG. 3, the yaw rate sensor 38 is accommodated in the ESC controller 6. As an alternative, it can also be accommodated in the airbag controller 10. The yaw rate 44 is therefore fed into the M2XPro device 12 via the databus 4. In the same way, the longitudinal, transverse and vertical acceleration sensor, not shown in greater detail, can also be accommodated in the ESC controller 6 or in the airbag controller 10 and correspondingly feed the longitudinal, transverse and vertical acceleration into the vehicle dynamics interface 25 of the M2XPro device 12 via the databus 4.

Figure 4:
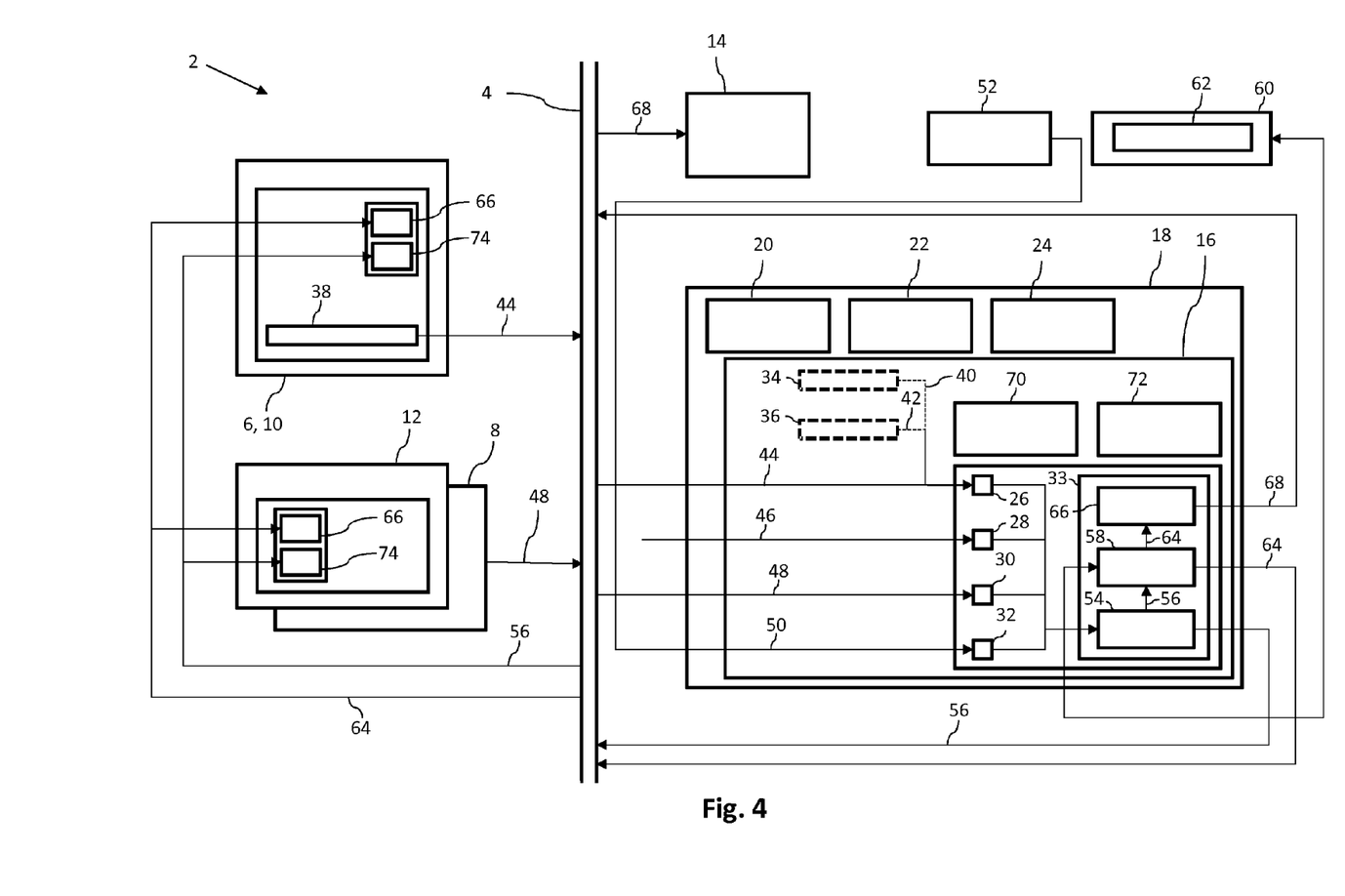
FIG. 4 shows a diagrammatic view of a section from an alternative vehicle on-board system.

Reference is made to FIG. 4 which shows a diagrammatic view of a section from an alternative vehicle on-board system 2.

The embodiment of FIG. 4 is based on the embodiment according to FIG. 3 where the wheel revolutions 46 can again be supplied directly to the M2XPro device 16 analogously to FIG. 2.

Figure 5:
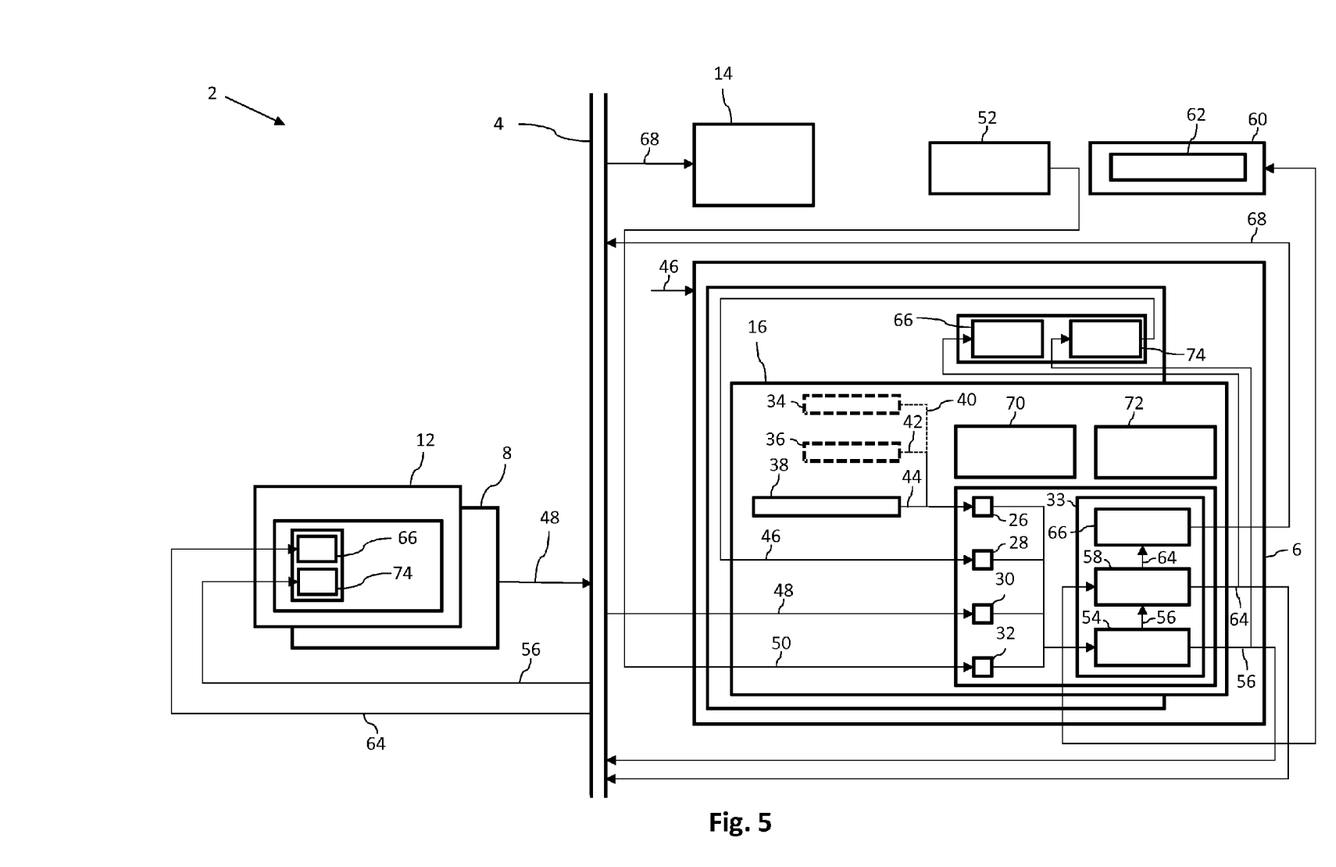
FIG. 5 shows a diagrammatic view of a section from an alternative vehicle on-board system.

Reference is made to FIG. 5 which shows a diagrammatic view of a section from an alternative vehicle on-board system 2.

In FIG. 5, the M2XPro device 16 is accommodated in the ESC controller 6. In this manner, the wheel revolutions 46 can be conducted to the M2XPro device 12 internally in the ESC controller 6. Furthermore, the M2XPro cluster 18 with its hardware components 20, 22, 24 is omitted completely.

Figure 6:
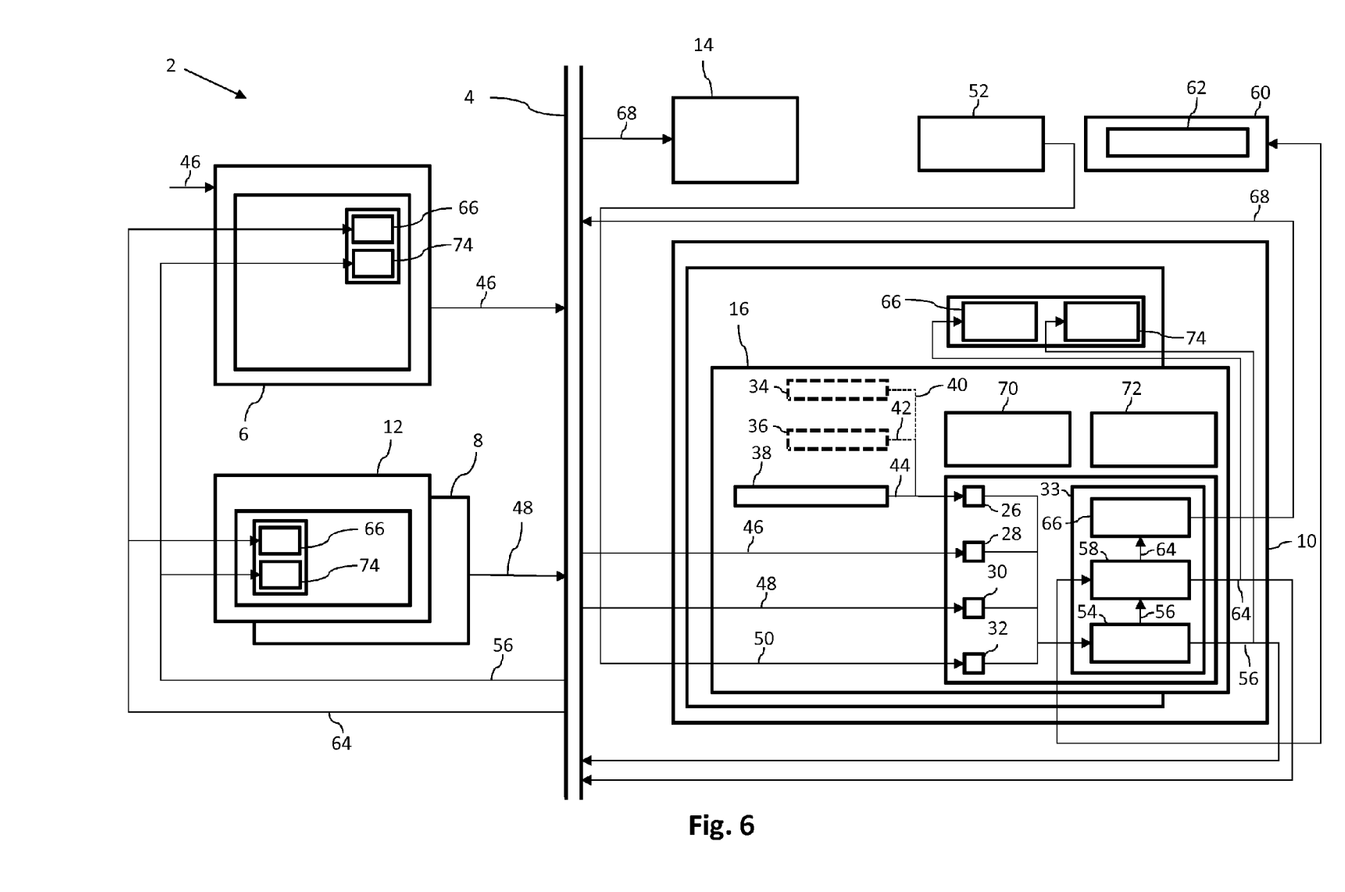
FIG. 6 shows a diagrammatic view of a section from an alternative vehicle on-board system.

Reference is made to FIG. 6 which shows a diagrammatic view of a section from an alternative vehicle on-board system 2. As can be seen from FIG. 6, the M2XPro device 16 can be accommodated in any controller of the vehicle, not shown in further detail, which is illustrated, for example, by way of the airbag controller 10.

Figure 7:
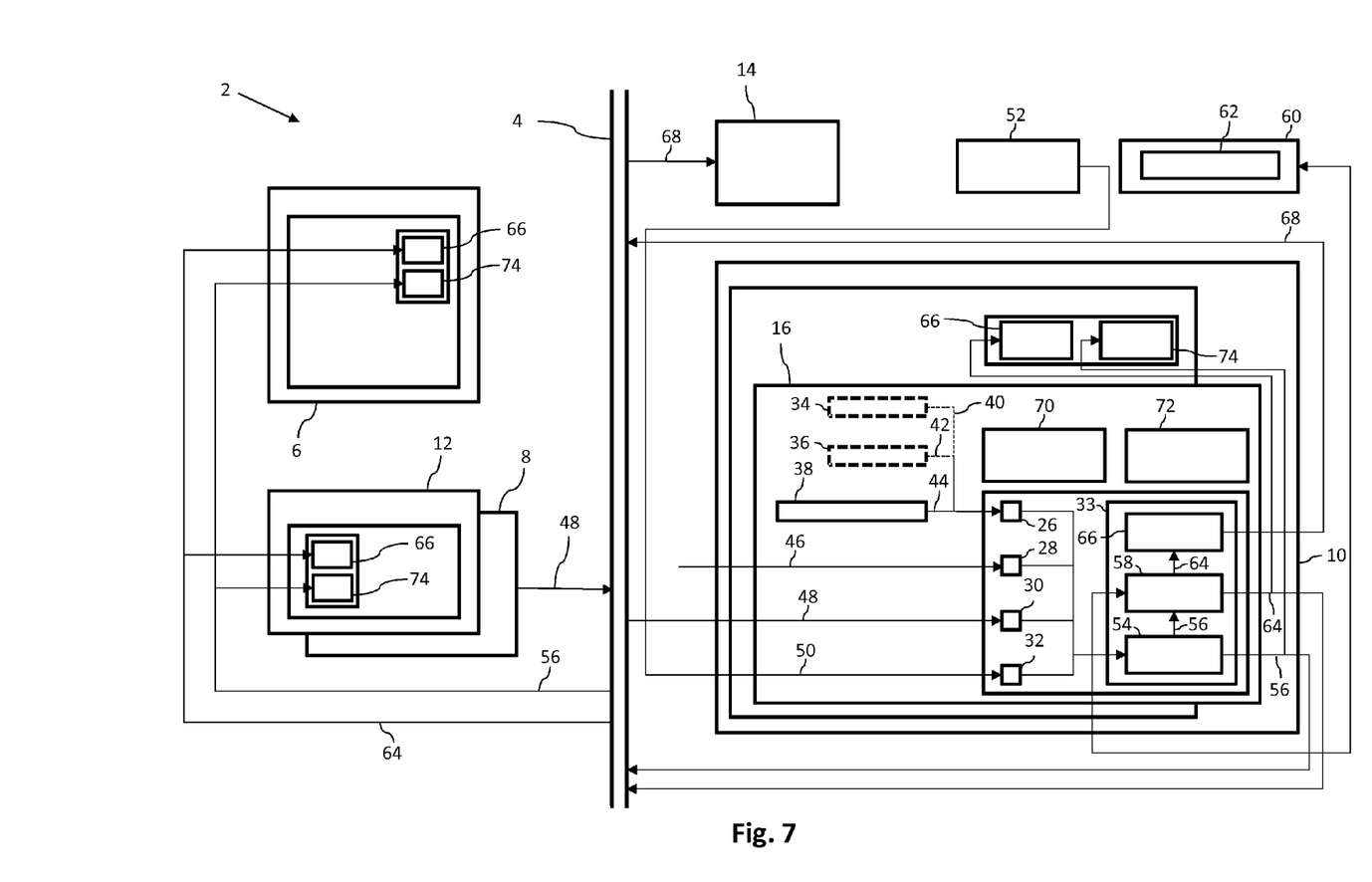
FIG. 7 shows a diagrammatic view of a section from an alternative vehicle on-board system.

Reference is made to FIG. 7 which shows a diagrammatic view of a section from an alternative vehicle on-board system 2. The embodiment of FIG. 7 is based on the embodiment according to FIG. 6, where the wheel revolutions 46 can again be supplied directly to the M2XPro device 16 analogously to FIG. 2.

Figure 8:
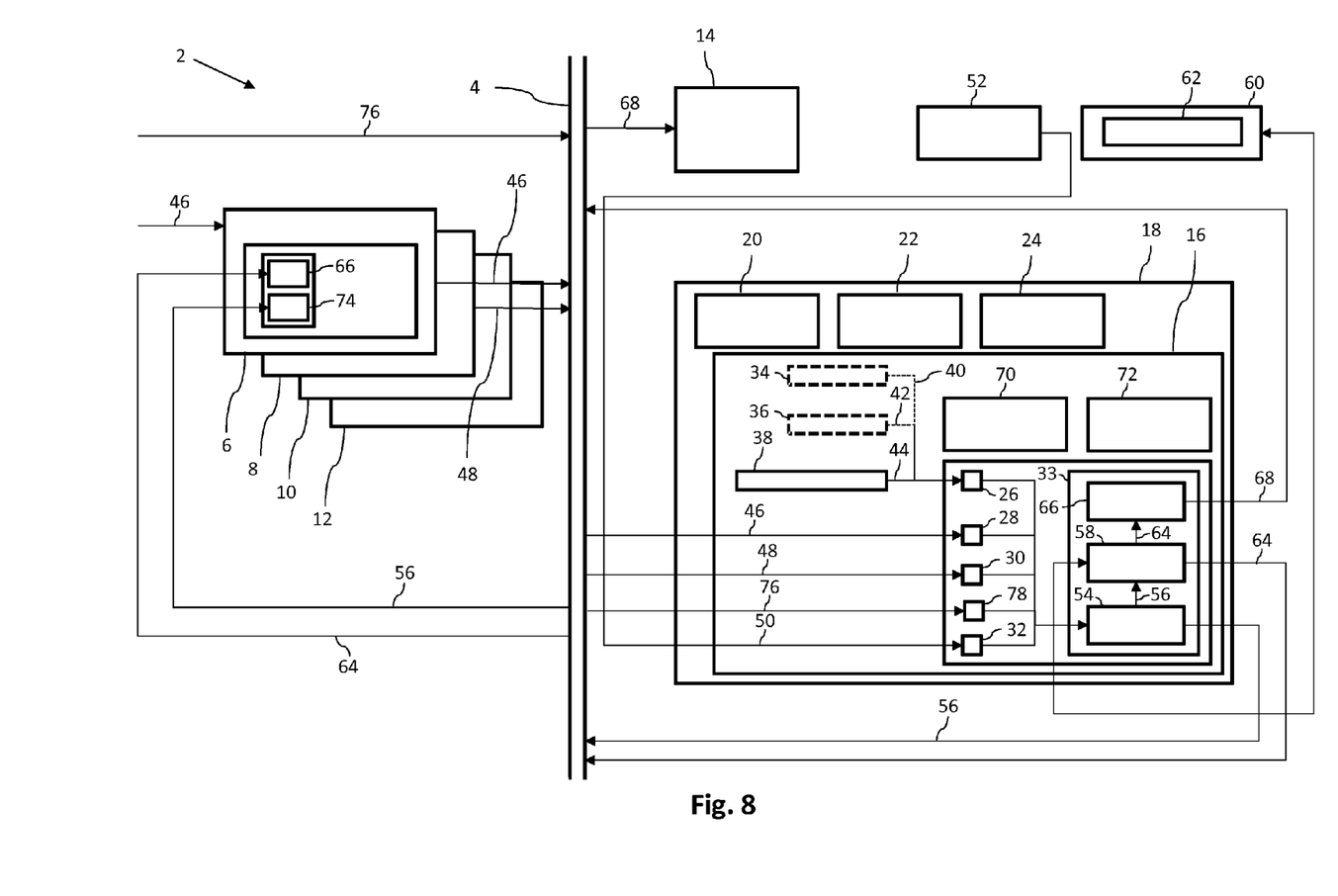
FIG. 8 shows a diagrammatic view of a section from an alternative vehicle on-board system.

Reference is made to FIG. 8 which shows a diagrammatic view of a section from an alternative vehicle on-board system 2. In the embodiment of FIG. 8, additional sensor signals 76 are fed into the databus 4, which can then be received in the M2XPro device 16 via an additional interface 78 and processed in the fusion facility 54.

Figure 9:
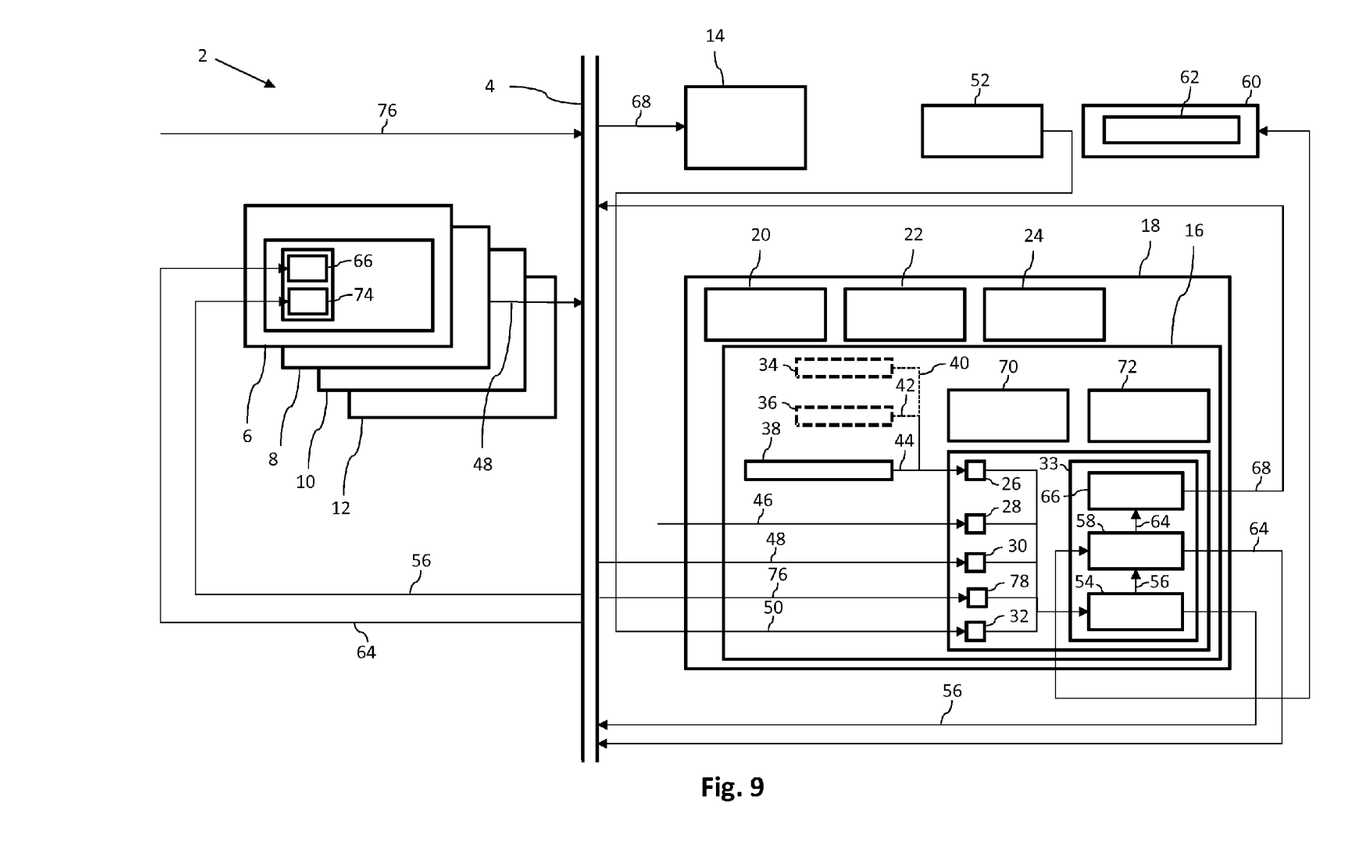
FIG. 9 shows a diagrammatic view of a section from an alternative vehicle on-board system.

Reference is made to FIG. 9 which shows a diagrammatic view of a section from an alternative vehicle on-board system 2. The embodiment of FIG. 9 is based on the embodiment according to FIG. 8, where the wheel revolutions 66 can be supplied directly to the M2XPro device 16 again analogously to FIG. 2.

By means of the proposed architectures, the fusion facility 54 and the software and hardware necessary for its operations are easily integrated into the architecture of the vehicle not shown in greater detail. For this purpose, a separate unit is used, for example, in the form of the M2XPro cluster 18, or pre-existing controllers 6 to 12 are used. In addition, the signals needed for the fusion which can consist, for example, of the GPS signals 50, the vehicle dynamics signals 40, 44 or the wheel speed sensors 46 and the steering angle 48, can be supplied to the M2XPro device 16 in real time which is ensured, for example, by the databus 4. Finally, the M2XPro device 16, as a host, represents the possibility to execute M2XPro applications 66 and thus to integrate further software.

As already mentioned, the M2XPro device 16 can be accommodated in a separate cluster 18 or in a pre-existing module of the vehicle not shown such as, for example, one of the controllers 6 to 12. As can be seen from the wheel revolutions 46, individual sensor signals can be supplied to the M2XPro device 16 either directly or via a pre-existing controller 6 to 12 which uses the corresponding sensor signal itself, in any case. As can be seen from the inertial sensors 34 to 38, individual sensors can also be accommodated themselves in the M2XPro device 16.

In the present embodiments, a similar feature of all architectures is that a databus 6 distributes the data of the sensors distributed outside the M2XPro device 12. A steering angle sensor, not shown in greater detail and connected to the ESP controller 8, also always applies the steering angle to the databus 6. The GPS antenna 52 and the Car2X antenna 60 can be combined in a manner not shown in greater detail in a common antenna module and have a common interface to the M2XPro device 16. In the M2XPro device, Car2X applications 66 are accommodated which, for example, handle non-safety-critical evaluations for the HMI unit 14. By contrast, Car2X applications 66 which are appropriate for the operation of the respective controllers 6 to 12 such as, for example, securing measurement data on the basis of redundantly present measurement data from other sensors, are accommodated in the individual controllers 6 to 12.

While the above description constitutes the preferred embodiment of the present invention, it will be appreciated that the invention is susceptible to modification, variation and change without departing from the proper scope and fair meaning of the accompanying claims.

The invention claimed is:

1. A device for distributing vehicle data about a vehicle, comprising:
    a first sensor data reception interface for receiving first sensor data from a first sensor;
    a second sensor data reception interface for receiving second sensor data from a second sensor;
    a transmission interface for transmitting the vehicle data about the vehicle on the basis of the first sensor data and the second sensor data to a receiver;
    the device comprises longitudinal, lateral and vertical acceleration sensors;
    the device is accommodated in an electronic stability control unit or in an air bag control unit;
    wherein the first sensor data reception interface is configured to directly receive the first sensor data from the first sensor;
    wherein the second sensor data reception interface is a databus interface connected to a databus, wherein the databus interface is configured to receive the second sensor data from the second sensor via the databus;
    wherein the transmission interface is configured to transmit the vehicle data to the databus; and
    wherein the device includes a fusion facility for linking the first sensor data directly received by the first sensor and the second sensor data received by the databus.

2. The device as claimed in claim 1, further comprising wherein the first sensor data reception interface is configured to receive position data from a position data sensor as the first sensor.

3. The device as claimed in claim 1, further comprising the vehicle data about the vehicle includes motion data describing a movement of the vehicle.

4. The device as claimed in claim 1, further comprising wherein the second sensor data includes steering angle data from a steering angle sensor as the second sensor.

5. The device as claimed in claim 1, further comprising wherein the transmission interface comprises a filter for filtering the vehicle data about the vehicle from the linked first sensor data and the second sensor data.

6. An on-board system for a vehicle comprising:
    a databus;
    a sensor connected to the databus, the sensor is configured for feeding sensor data into the databus;
    a device connected to the databus, the device having a first sensor data reception interface for receiving first sensor data from a first sensor;
    wherein the first sensor data reception interface is configured to directly receive the first sensor data from the first sensor;
    a second sensor data reception interface for receiving second sensor data from a second sensor, wherein the second sensor data reception interface is a databus interface connected to a databus, wherein the databus interface is configured to receive the second sensor data from the second sensor via the databus;
    a transmission interface for transmitting the data about the vehicle on the basis of the first sensor data and the second sensor data to a receiver;
    the device being configured to distribute via the databus at least data about the vehicle on the basis of the sensor data;

the device comprises longitudinal, lateral and vertical acceleration sensors;

the device is accommodated in an electronic stability control unit or in an air bag control unit; and wherein the device includes a fusion facility for linking the first sensor data directly received by the first sensor and the second sensor data received by the databus.

7. The on-board system as claimed in claim 6, further comprising an antenna for wirelessly transmitting the data about the vehicle.

* * * * *